No. 840,056. PATENTED JAN. 1, 1907.
F. A. GROSSE.
APPARATUS FOR MANUFACTURING HOLLOW GLASSWARE.
APPLICATION FILED NOV. 16, 1905.

2 SHEETS—SHEET 1.

Witnesses:—
C. H. Schilling
Paul Arras.

Inventor:—
Friedrich Arthur Grosse
by Paul E. Schilling
his attorney

No. 840,056. PATENTED JAN. 1, 1907.
F. A. GROSSE.
APPARATUS FOR MANUFACTURING HOLLOW GLASSWARE.
APPLICATION FILED NOV. 16, 1905.

2 SHEETS—SHEET 2.

Witnesses:—
C. H. Schining
Paul Arras

Inventor:—
Friedrich Arthur Grosse
By Paul F. Schilling
his attorney

UNITED STATES PATENT OFFICE.

FRIEDRICH ARTHUR GROSSE, OF BISCHOFSWERDA, GERMANY.

APPARATUS FOR MANUFACTURING HOLLOW GLASSWARE.

No. 840,056.  Specification of Letters Patent.  Patented Jan. 1, 1907.

Application filed November 16, 1905. Serial No. 287,629.

*To all whom it may concern:*

Be it known that I, FRIEDRICH ARTHUR GROSSE, a subject of the German Emperor, residing at Bischofswerda, Germany, have invented certain new and useful Improvements in Apparatus for Manufacturing Hollow Glassware, of which the following is a specification.

The present invention has reference to improvements in apparatus for manufacturing hollow glassware, and relates more especially to improvements in apparatus as described by me in a pending application for patent, Serial No. 212,855, filed June 16, 1904. This latter application deals with an apparatus for forming rod-like glass bodies, possessing a mold within which is reciprocated the core, which can also be rotated about its longitudinal axis.

The present invention now has for its object certain improvements in such apparatus, and relates more specifically to improved means for causing the mold to assume a horizontal position after pouring in of the liquid glass and for running it into the annealing-oven for cooling off the cast.

Figure 1:
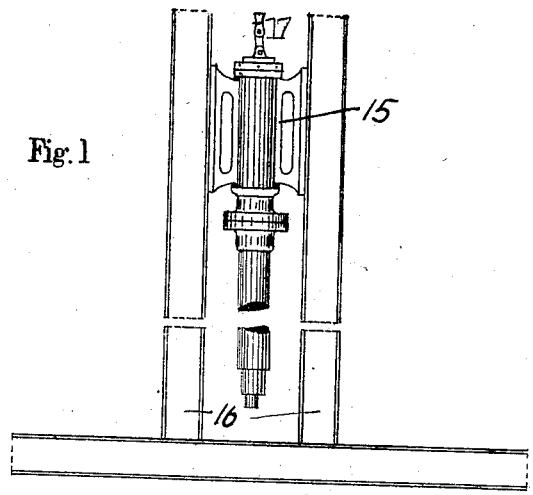
Figure 2:
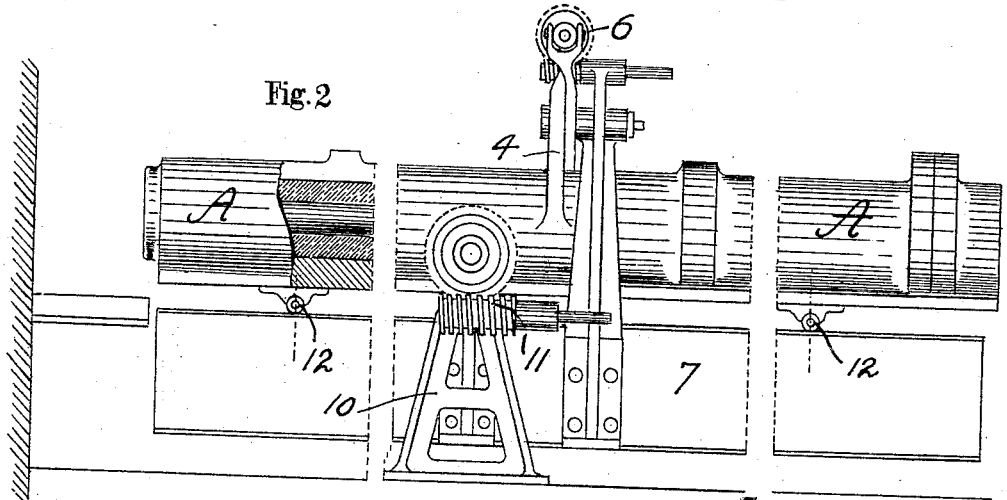
Figure 3:
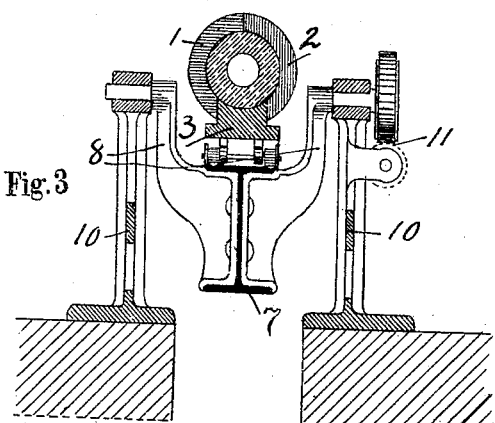
Figure 4:
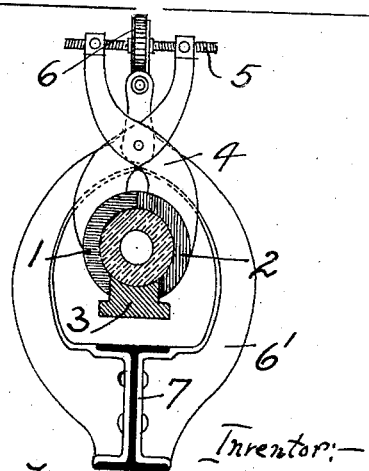
Figure 5:
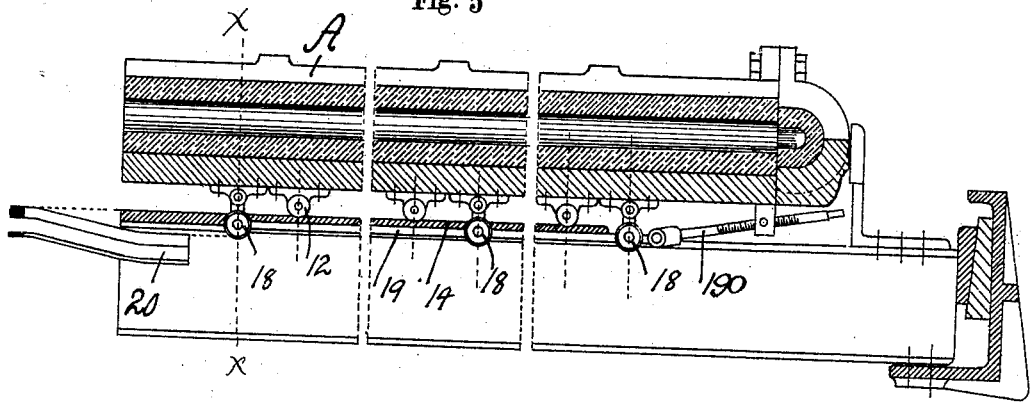
Figure 6:
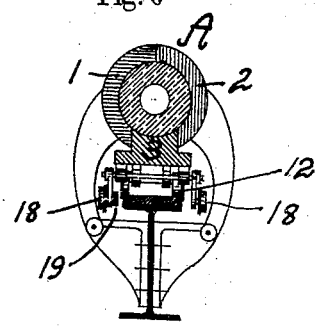
Figure 7:
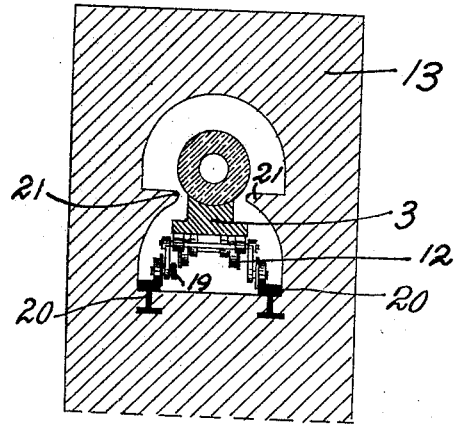

In the accompanying drawings, Figure 1 represents the means for guiding the core in its vertical up-and-down movement. Fig. 2 is a side elevation, partly in section, of portions of the operating parts. Fig. 3 is a cross-sectional view of the mold and coöperating parts for turning the mold. Fig. 4 is a cross-section of the mold and adjacent parts, the several mold parts being held together by a tongs device. Fig. 5 is a longitudinal sectional view of the improved means for running the mold into the annealing-oven. Fig. 6 is a cross-sectional view on line X X of Fig. 5, and Fig. 7 is a cross-section through the annealing-oven with run-in mold and truck.

In the apparatus herein described the mold is maintained in a vertical position with the core in place therein and molten glass is poured in at the top of the mold, settling down therein around the core, forming as it cools the tubular product. When the glass in the mold has solidified, the core is removed and the mold containing the tubular product is turned to a horizontal position and pushed into an annealing-oven to properly anneal the product.

The mold A is preferably built in three parts 1 2 3, which may be detachably connected in any suitable manner by means of bands, bolts, or the like. In some cases I adopt the method of connection shown in Fig. 4, where a pair of tongs 4 press the portions of the mold together. The one jaw presses against the member 1 and the other against the member 2.

If desired, jaws and mold parts may be in rigid connection, or they can be cast in one piece when this appears desirable.

The tongs are opened and closed by any suitable means. In Fig. 4 a right and left hand threaded spindle 5 and worm-gear 6 are shown for this purpose. The tongs 4 are carried by a frame 6', bolted to a girder 7.

After the article has been cast the mold is transferred from the vertical into a horizontal position. For this purpose, as Fig. 3 shows, arms 8 are riveted to the girder 7 and carry journals which are turned in bearings in the uprights 10 by means of worm-gear 11. In this manner the mold can readily be brought out of the vertical position into a horizontal one, whereby the mold part 3, which is provided with rollers 12, will be caused to lie upon the girder 7. The tongs are then released and the mold parts 1 and 2 separated laterally. The mold-bottom, with its rollers, which I will hereinafter call the "truck," is now pushed, with the exposed article on it, into the annealing-oven 13, Fig. 7. On its course it will run off the end of the girder 7 onto the rails 14, conducting into the furnace.

In the vertical position of the mold the core is provided with a guide-head 15, running between rails 16, and is drawn up or let down by means of a chain 17, as shown in Fig. 1.

The special means to run the truck into the oven and to therein deposit the cast article and then to retreat the mold-truck are illustrated in Figs. 5–7. As above described, the bottom part of the mold is provided with rollers for the purpose of running it into and out of the oven. In addition to these rollers I provide several other sets of rollers 18 and secure their supporting-cheeks in such manner to the truck that they can simultaneously all be tilted in longitudinal direction. For this purpose I pivot the various cheeks to the truck and pivotally secure to them a common draw-bar 19, which can be actuated in any suitable manner, as by a screw 190, Fig. 5. I further provide a set of rails 20, leading into the annealing-oven and having their forward end somewhat depressed, as shown in Fig. 5 The rails 14 terminate in front of the oven, and the rollers 12 leave these rails as soon as the tilting rollers 18 ascend their rails 20. After the truck is run in the draw-bar is actuated, causing the rollers 12 to swing around, with the effect of lowering the truck, with the cast article on it. The oven 13 is provided with longitudinal projections or ledges 21, upon which the article settles and is retained thereon upon the truck being run out on the rails 20.

What I claim is—

1. Apparatus for manufacturing glassware, comprising in combination a girder, a frame supported thereon, tongs mounted on said frame, a mold consisting of separable parts engaged by said tongs, means for actuating said tongs to open and close the same, and a core reciprocable in the mold, substantially as described.

2. Apparatus for manufacturing hollow glassware, comprising in combination, a composite mold, rollers on the bottom part of said mold whereby it may be moved to and fro, tongs normally holding the mold parts together, a frame and actuating means for said tongs, a girder supporting said frame and presenting a track for the rollers on the mold-bottom, supporting means extending from said girder, bearings in which said supporting means turn, a core, means for reciprocating said core within said mold, and means for bringing the said mold from the vertical into the horizontal position and vice versa, substantially as described.

3. Apparatus for manufacturing hollow glassware, comprising in combination, a composite mold, rollers on the bottom part of said mold whereby it may be moved to and fro, tongs normally holding the mold parts together, a frame and actuating means for said tongs, a girder supporting said frame and presenting a track for the rollers on the mold-bottom, supporting means extending from said girder, bearings in which said supporting means turn, a core, means for reciprocating said core within said mold, means for bringing the said mold from the vertical into the horizontal position and vice versa, sets of tilting rollers on said mold-truck, means for simultaneously actuating said tilting rollers for the purpose of lowering or raising said mold-truck, an annealing-oven, means for guiding said truck within the annealing-oven, and means for supporting the cast article within the oven when the truck has been lowered and withdrawn, substantially as described.

In testimony whereof I affix my signature in presence of two witnesses.

FRIEDRICH ARTHUR GROSSE.

Witnesses:
PAUL E. SCHILLING,
PAUL ARRAS.